United States Patent Office 3,121,727
Patented Feb. 18, 1964

3,121,727
SYNTHESIS OF GLYCIDYL ETHERS OF POLYHYDRIC PHENOLS
John J. Baliker, Jr., Kenneth B. Cofer, and Leonard H. Griffin, Pasadena, and Dwight M. Sheets, Houston, Tex., assignors to Shell Oil Company, New York, N.Y., a corporation of Delaware
No Drawing. Filed Oct. 17, 1960, Ser. No. 62,853
2 Claims. (Cl. 260—348.6)

This invention relates to an improved process for the manufacture of glycidyl ethers of polyhydric phenols. More particularly it relates to improvements in reaction rate and product purity in the manufacture of such glycidyl ethers.

Glycidyl polyethers of polyhydric phenols, often termed "epoxy resins," are valuable materials which are used in many applications such as surface coatings, adhesives, molding compositions, and the like. They are generally prepared by reacting a polyhydric phenol with epichlorohydrin in an alkaline medium. A particularly versatile group of epoxy resins are manufactured from epichlorohydrin and a dihydric phenol such as 2,2-bis(4-hydroxyphenyl)propane, often called p,p'-bisphenol A or simply bisphenol A. The predominant constituent of these polyethers may be represented by the formula

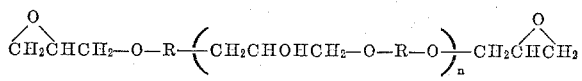

wherein $n$ is an integer of the series 0, 1, 2, 3, etc. and R represents the divalent radical to which the two phenolic hydroxy groups are attached in the dihydric phenol. The mol ratio of epichlorohydrin to dihydric phenol employed in preparing the resin is the most important factor in controlling the average molecular weight of the polyether and hence the average value of $n$. Certain uses of epoxide resins require that they have a particular average value of $n$. Thus, for adhesive application it is desirable that average $n$ closely approach zero. The present invention is particularly directed to the production of compounds having a predominant proportion of the diglycidyl ether of the bisphenol, i.e., those compounds in which $n$ is zero.

In the best processes heretofore known for the commercial production of digylcidyl ether of bisphenyl A it was found that the reaction rate limits the amount of time required for completion of the reaction between bisphenol A and epichlorohydrin. It was further found that because of the relatively long reaction times required, i.e. several hours, a significant amount of by-products other than a diglycidyl ether was made, including compounds which retain chlorine even after the conventional dehydrochlorination has been completed. In the commercial production of diglycidyl ether and bisphenol A by methods heretofore in use a reaction time of 2 to 3 hours is usually required for completion of caustic addition and the best product which can be made from ingredients of commercial purity contains total chlorine of the order of 0.3% by weight and saponifiable chlorine of the order of 0.1% wt. or more.

It is an object of this invention to provide an improved method for carrying out the production of glycidyl ethers of polyhydric phenols. It is a specific object to provide an improved method for the industrial production of diglycidyl ether of p,p'-bisphenol A. Another specific object is to provide a method for the industrial production of diglycidyl ether of p,p'-bisphenol A in which the reaction time is in the range from 15 minutes to 1 hour and in which the resulting product has a very low content of total chlorine and of saponifiable chlorine. Other objects will be apparent from the following description of this invention.

According to this invention glycidyl ether of a polyhydric phenol is produced by adding an aqueous solution of alkali metal hydroxide containing at least 15% by weight of the hydroxide to an agitated solution of a polyhydric phenol in at least about 3 mols of epichlorohydrin per phenolic hydroxyl equivalent of the phenol and a sufficient amount of methanol to maintain a single liquid phase until reaction is complete. The addition of said hydroxide solution is controlled at a rate which permits removal of heat of reaction by removing a vapor stream from the reaction mixture at approximately atmospheric pressure, condensing said vapor stream and returning the condensate to the reaction.

The chemical reactions involved in producing the glycidyl ethers of polyhydric phenols and the various phenols which can be used as reactants are described in some details in U.S. 2,801,227 to Goppel, which is incorporated herein by reference to avoid unnecessary repetition of subject matter already well known to the art. For purposes of explaining the present invention it is sufficient to discuss the production of the diglycidyl ether of 2,2-bis(4-hydroxyphenyl)propane. It will be understood that the reaction can be carried out with other phenols such as those enumerated by Goppel.

The method described by Goppel is a useful commercial method for the production of epoxy resins. It will be noted, however, that in a typical process according to that method (Example I) the time required for addition of aqueous sodium hydroxide was 3½ hours, the reaction temperature was between 210° and 246° F. and the product obtained had an epoxy value of 0.519 epoxy equivalents per 100 grams (which corresponds to a weight per epoxide of 193) and contained 0.52% chloride.

By contrast, in the process of this invention the reaction is completed in a period from 10 to 15 minutes on laboratory scale and even in available commercial equipment in 30 minutes or less; the reaction temperature is generally about 160° to 180° F.; and the resulting diglycidyl ether of bisphenol A has a weight per epoxide of about 180 and a total chlorine content of about 0.2% or less.

In the methods heretofore employed, such as described for example in the Goppel patent, it has been necessary to maintain the concentration of water at a very low value, e.g., from about 0.3 to 2% by weight, during the course of reaction in order to avoid the formation of a second layer with the resulting side reactions. In the process of the present invention the addition of methanol makes the water concentration much less critical; much higher water concentrations can be tolerated. In the process of this invention, water removal is not necessary during the reaction step.

The process of this invention has permitted for the first time the direct production of a concentrate of diglycidyl ether of bisphenol A which contains an extremely low proportion of total chlorine and saponifiable chlorine without requiring resort to elaborate methods of recrystallization or redistillation. The process further has reduced the time requirement for addition of caustic during the condensation reaction step from 2 hours or more to one-half hour or less. This results in a very substantial increase in the capacity of existing commercial equipment or conversely, permits a substantial reduction in capital required to build a plant of a given throughput capacity.

Although various solvents have been heretofore proposed for use in the condensation of epichlorohydrin with polyhydric phenols, it has now been surprisingly found that methanol has unique and unexpected advantages. Its use results in a very substantial increase in reaction rate as well as a substantial reduction in chlorine content of the product. Although this invention is not to be limited by any theoretical consideration, it is believed that the extreme polarity of methanol is a material factor in achieving the superior results. It results in a homogeneous solution of epichlorohydrin and sodium phenolates. The homogeneous system favors the condensation to form the glycidyl ether. If a separate aqueous phase were to form during the reaction, the amount of by-product due to side reactions of the epichlorhydrin would become very substantial, resulting in impure product as well as in the loss of epichlorohydrin.

The process of this invention is suitably executed in a reaction vessel equipped with a mechanical stirrer, a valved inlet for feeding aqueous hydroxide solution, means for measuring the temperature of the reaction mixture, heating means, and a vapor outlet fitted with a condenser and vapor temperature measuring device. Condensed distillate from the condenser is returned to the reactor.

In carrying out the process the reactor is charged with the dihydric phenol, epichlorohydrin, and methanol. At least a small amount of water, e.g., about 1 percent, based on epichlorohydrin is present in the initial reaction mixture. When the reaction is initiated by the addition of aqueous caustic, the reaction mixture may be at ambient temperature or at a moderately elevated temperature. The temperature of the reaction mixture rises as caustic is gradually added. Temperature control is maintained by vaporization of light components from the reaction mixture and reflux thereof. The rate of caustic addition is controlled to avoid addition at a more rapid rate than that at which heat can be removed. After completion of the reaction, the reaction mixture is treated for recovery of the desired glycidyl ether substantially in the manner described in the Goppel patent.

The temperature of the reaction mixture before caustic addition is commenced may be ambient temperature. It is preferably moderately elevated, e.g., between about 130° and 150° F. and most preferably between about 140° and 145° F. During the addition step the temperature rises, e.g., to a value in the range from 160° to 180° F. Correspondingly lower or higher temperatures are used if operations are carried out at subatmospheric or superatmospheric pressure. However, the reaction is usually carried out at substantially atmospheric or slightly superatmospheric pressure, e.g., between 0 and 2 p.s.i.g. For best results it is desired to maintain the reaction pressure at a value which results in a temperature not above 180° F.

It is important in the process of this invention that a substantial concentration of methanol be present in the reactor at the initiation of the reaction. Useful results can generally be obtained with between 5% and 100%, but it is generally preferred to have 10% to 50% methanol initially present. At least sufficient methanol is required to maintain a single reaction phase throughout the reaction. Obviously, more methanol is required for this purpose if it is desired to use a relatively dilute aqueous caustic than is required when a very concentrated aqueous caustic is employed. For best results, the methanol concentration is generally maintained throughout the reaction period in the range between 15% and 25% by weight of methanol, based on the amount of epichlorohydrin present.

The presence of methanol in the stated concentration permits control of the reaction temperature at a relatively low value by virtue of methanol evaporation during caustic addition.

The vapor leaving the reaction mixture contains water, epichlorohydrin and methanol. The condensed vapor is not necessarily the equilibrium azeotrope since the boiling reaction mixture is relatively deficient in water. By virtue of the presence of methanol in the condensate no phase separation takes place.

The epichlorohydrin employed in the process is not only a reactant but is also a solvent for the polyhydric phenol and the resulting glycidyl ether of the phenol. As has been explained, the addition of methanol modifies the solution and permits the presence of substantial amounts of water without phase separation occurring. Usually the process is executed with use of about 3 to 8 mols of epichlorohydrin per phenolic hydroxyl equivalent of the polyhydric phenol, and preferably with from 4 to 6 mols. Large quantities can be used if desired, such as up to 6 mols or higher, but they give no particular advantage and are generally not employed because it is essential that all unreacted epichlorohydrin be recovered as a matter of economy. When the phenol is dihydric, the usual range is thus 6 to 16 mols epichlorohydrin per mol of phenol and preferably 8 to 12 mols per mol.

The alkali metal hydroxide, such as sodium or potassium hydroxide, is preferably added to the reaction mixture as an aqueous solution which contains at least about 15% by weight and may contain up to the saturation concentration of the hydroxide. It is preferred to use a relatively concentrated solution of about 40% to 45% concentration. Ordinary 48° Bé. commercial caustic soda is suitable.

The total amount of alkali metal hydroxide added is about 1 mol per phenolic hydroxy equivalent of the polyhydric phenol, i.e., about 2 mols per mol of dihydric phenol. This amount is sufficient to combine with and neutralize the hydrogen chloride liberated by the reaction between the epichlorohydrin and the phenol. Rather than using exactly one mole it is preferable to use a slight excess such as a 2% excess and in some cases up to 5% excess. Use of large excesses is avoided since this causes loss of epichlorohydrin to unwanted by-products. It is often preferred to add slightly less than a molar equivalent, e.g., about 1.95 mol NaOH per mol bisphenol A, during the reaction step, and to add the remainder, including the slight excess, during the dehydrochlorination step.

A small amount of water is required for the condensation reaction to take place. Additional water is formed during the condensation reaction and water is also added as part of the aqueous caustic. The amount of water originally present is preferably at least about 1% and may be up to 10% by weight of the reaction mixture. Depending on the conditions used, the concentration of water may become as high as about 14% during the course of the reaction without resulting in phase separation.

The time required for the addition of caustic during the condensation step in this process is not limited by the rate of reaction between epichlorohydrin and polyhydric phenol, but only by the rate at which heat can be removed from the reaction system. This is one significant difference between the process of this invention and those heretofore known. In the laboratory complete reaction has been obtained according to this invention in as little as 10 minutes and in commercial equipment 30 minutes is usually more than sufficient. Product of greater purity is obtained when caustic is added as rapidly as temperature control will permit and the reaction is discontinued after caustic addition is complete.

After completion of caustic addition any available method for recovering and purifying the resin may be suitably employed. Such methods are described in various patents and publications and are known to the art. It is important, however, that the preponderant amount of the saponifiable chlorine remaining in the resin at the completion of caustic addition be removed by a dehydrochlorination reaction. The following describes a representative method of product workup.

Followng the completon of caustic addition, unreacted epichlorohydrin and the methanol and water are removed from the reaction mixture. This may suitably be done by flash distillation at atmospheric pressure. The small remaining amount of these low molecular weight ingredients may then be removed by stabilizing the resin, e.g., by vacuum distillation such as distillation at 15 mm. Hg absolute at 320° F. for 15 minutes. Alternatively, the remaining light ingredients may be removed by steam stripping.

The remaining product contains sodium chloride formed during the condensation reaction. This may be removed in known manner, e.g., by adding methyl isobutyl ketone and water to result in a two phase system in which the upper layer consists of a solution of the desired diglycidyl ether in methyl isobutyl ketone and the lower layer consists of an aqueous brine. The resin can be recovered by separating the upper layer. The separated resin solution is then suitably treated with an equal volume of 5% caustic at 190° F. for 1 hour to remove the remaining chlorine by a dehydrochlorination reaction. The resin solution is then neutralized, e.g., by adding an equal volume of 3-4% aqueous monosodium phosphate and removing the residual methyl isobutyl ketone by flash distillation. The essentially solvent-free resin can then again be stabilized, e.g., by vacuum distillation at about 15 mm. Hg and 340° F. for 15 minutes. After filtering, the resulting product is a resin of extremely high purity.

The invention may be better understood from the following illustrative and comparative examples. The invention is not to be construed as limited to the details described. Percentages and parts in the examples and throughout the speification are by weight, unless otherwise indicated.

EXAMPLE 1

Ten parts of epichlorohydrin, 5 parts of methanol and 1 part of bisphenol A containing about 97% of the p,p' isomer are placed in a stirred flask. 0.1 part of water is added and the mixture heated to 150° F. 45% aqueous caustic at ambient temperature is then gradually added over a period of 30 minutes. The total amount of caustic added is 1.95 mols per mol of bisphenol A. The reaction temperature rises to the atmospheric boiling point of the mixture which is 162° F. Vapor distilled from the reaction vessel during the period of caustic addition is condensed and returned to the reactor; no phase separation is observed. The water content of the reactor gradually rises to about 8%.

Following completion of caustic addition, excess epichlorohydrin, water and methanol are removed from the crude resin by flash distillation at atmospheric pressure. The resin is then stabilized at 320° F. and about 15 mm. Hg absolute for 15 minutes. Methyl isobutyl ketone and water are added to yield a two-phase system consisting of a resin-methyl isobutyl ketone upper layer and a brine lower layer. The upper layer is separated and batch dehydrochlorinated with an equal volume of 5% wt. caustic at 190° F. for one hour. Following neutralization of the resin solution with an equal volume of 3-4% wt. aqueous monosodium phosphate and removal of residual methyl isobutyl ketone by flash distillation, the essentially solvent-free resin is further stabilized at 320° F. and about 15 mm. Hg absolute for 15 minutes and then filtered.

The resin produced in this experiment had a viscosity of 75 poises at 25° C. and a molecular weight per epoxide group of 184. The cure rate of the resin, determined in a standard fashion by observing the change in refractive index with time, was $54 \times 10^{-4}$.

EXAMPLE 2

A series of experiments were carried out in which the methanol concentration was varied and the reaction temperature was permitted to vary accordingly, since all reactions were carried out at atmospheric pressure. Reaction time was 1 hour, the water content rose during cautsic addition from 1 to 8% by weight, the epichlorohydrin to bisphenol A mol ratio was 10:1, the caustic to bisphenol A mol ratio 1.95:1. The results are indicated in the following Table 1.

Table 1

| Reaction Conditions | | Resin Properties | | |
|---|---|---|---|---|
| CH₃OH Concentration, g./100 g. ECH | Reaction Temperature, °F. | Viscosity, Poises, 25° C. | Cure Rate, ΔRI×10⁴ | Weight per Epoxide |
| 100 | 156 | 97 | 62 | 184 |
| 50 | 162 | 75 | 54 | 184 |
| 20 | 171 | 70 | 60 | 182 |
| 10 | 178 | 83 | 70 | 181 |
| 5 | 187 | 92 | 95 | 184 |

It is seen that the best results, as indicated by a low viscosity and a low weight per epoxide, were obtained with a methanol concentration of 20% based on epichlorohydrin at a reaction temperature of 171° F. Results with 10 and 50% methanol, based on epichlorohydrin, were still quite satisfactory. The extreme concentrations of 5% and 100% respectively, were substantially less satisfactory.

EXAMPLE 3

Although the above experiments were carried out at reaction times of 1 hour it was found that equally good results were obtained when the reactions with methanol solvent present were repeated at reaction times of as little as 15 minutes.

EXAMPLE 4

Reactions were carried out similarly to Example 2 but using a variety of different solvents. The results obtained with methanol, ethanol, isopropanol and acetone are illustrated in Table 2. Tht greatly superior results obtained with methanol are apparent from the fact it showed the lowest weight per epoxide, a very much lower viscosity, and a very much lower content of total chlorine and of saponifiable chlorine, as well as much lower color.

Table 2

| | Reaction—Solvent | | | | |
|---|---|---|---|---|---|
| | Ethyl Alcohol | Isopropyl Alcohol | Acetone | Methyl Alcohol | |
| Weight per Epoxide | 207 | 190 | 199 | 181 | 184 |
| Viscosity, ps. at 25° C | 170 | 150 | 110 | 82 | 97 |
| Total Chlorine, percent wt. | 2.4 | 0.5 | 1.0 | 0.2 | 0.2 |
| Saponifiable Chlorine, percent wt | 2.0 | 0.3 | 0.6 | 0.03 | 0.09 |
| Color, Gardner | 6-7 | 3 | 3 | 1 | 1-2 |
| Ratio of Solvent to ECH | 2/1 | 1/1 | 1/1 | 0.2/1 | 1/1 |

EXAMPLE 5

When Example 1 is repeated with substitution of different phenols for the bisphenol, similarly superior products are obtained. The phenols substituted in Example 1 are, for example, resorcinol, hydroquinone, 4,4'-dihydroxyldiphenyl, bis-4-hydroxyphenyl methane and others.

We claim as our invention:
1. A process for the production of diglycidyl ether of 2,2-bis(4-hydroxyphenyl)propane which comprises
   (A) adding a concentrated aqueous solution of sodium hydroxide to an agitated solution containing
      (a) said phenol,
      (b) from about 6 to about 16 mols of epichlorohydrin per mol of phenol,
      (c) from 1 to 10 percent by weight of water, and
      (d) a sufficient amount of methanol in the range from 0.1 to 0.5 part by weight per part of epichlorohydrin, to maintain a single liquid phase throughout the reaction;
   (B) removing heat of reaction by removing a vapor stream from the reaction mixture, condensing said vapor stream, and returning the condensate to the reactor;
   (C) the rate of adding said solution of sodium hydroxide being such that the condensation reaction between said phenol and epichlorohydrin is complete within 30 minutes, and (D) the rate of said heat removal being such that the heat of reaction is removed from the reaction zone while maintaining the reaction mixture at its boiling point, and (E) recovering a reaction product characterized by a weight per epoxide group of about 180 to 184 and a total chlorine content of no more than about 0.2% by weight.

2. The process according to claim 1 wherein said agitated solution, prior to said addition of sodium hydroxide solution, is at a temperature of between about 130° and 150° F. and the reaction temperature, after addition of sodium hydroxide solution has been initiated, is maintained in the range from 160° to 180° F.

References Cited in the file of this patent

UNITED STATES PATENTS

| | | |
|---|---|---|
| 2,739,160 | Bell et al. | Mar. 20, 1956 |
| 2,848,435 | Griffin et al. | Aug. 19, 1958 |
| 2,898,349 | Zuppinger et al. | Aug. 4, 1959 |
| 2,932,626 | Phillips et al. | Apr. 12, 1960 |
| 2,943,095 | Farnham et al. | June 28, 1960 |
| 3,014,892 | Schwarzer et al. | Dec. 26, 1961 |
| 3,016,362 | Wismer | Jan. 9, 1962 |
| 3,033,803 | Price et al. | May 8, 1962 |
| 3,033,816 | Price et al. | May 8, 1962 |
| 3,033,819 | Price et al. | May 8, 1962 |